Jan. 28, 1958  E. V. SUNDT  2,821,063
CLOCKWORK MECHANISM
Filed Feb. 17, 1956  2 Sheets-Sheet 1
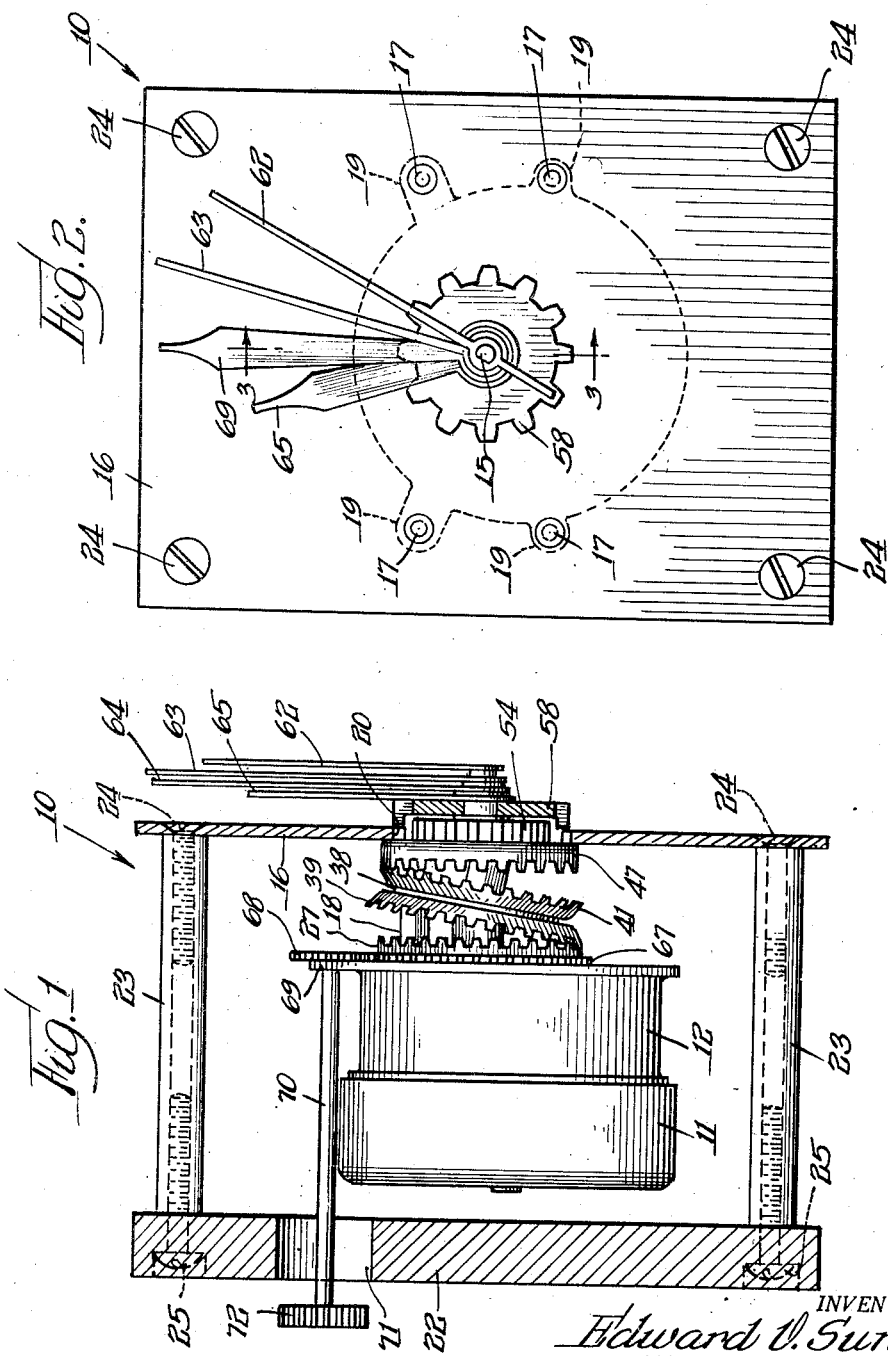
INVENTOR.
Edward V. Sundt
BY:
Wallenstein & Spangenberg
Attys.

Jan. 28, 1958 E. V. SUNDT 2,821,063
CLOCKWORK MECHANISM
Filed Feb. 17, 1956 2 Sheets-Sheet 2
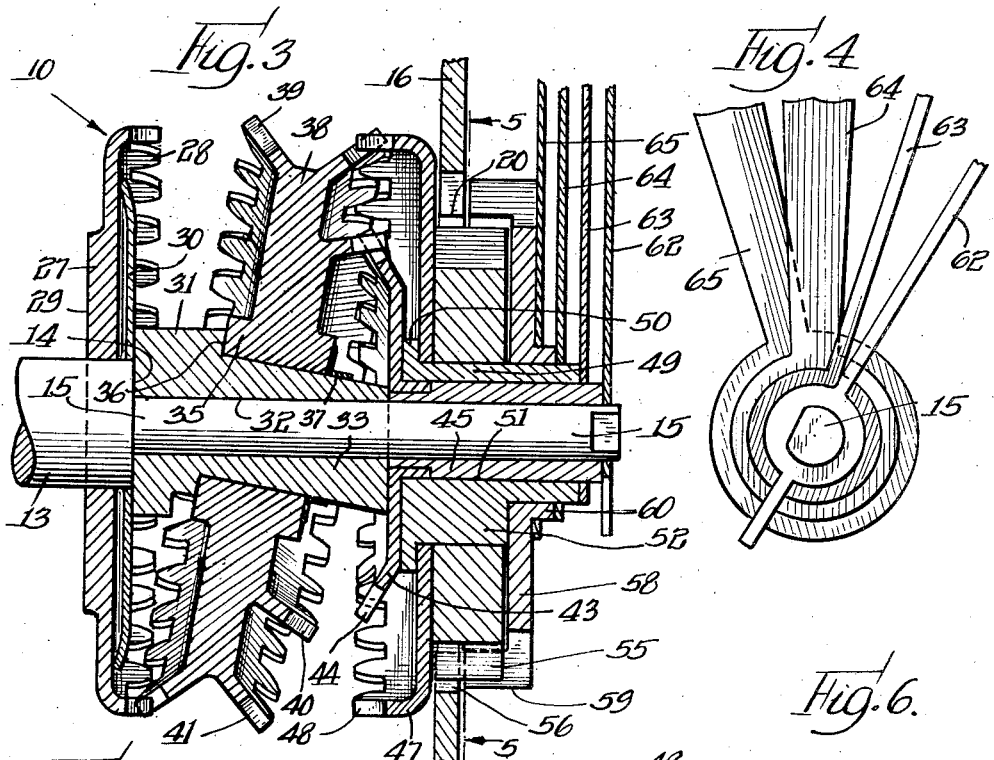
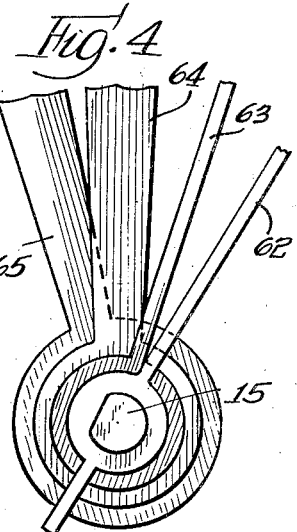
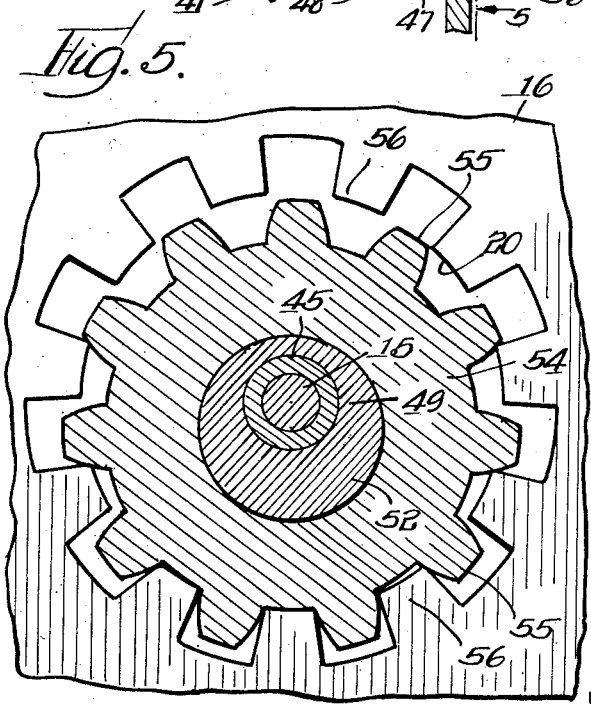
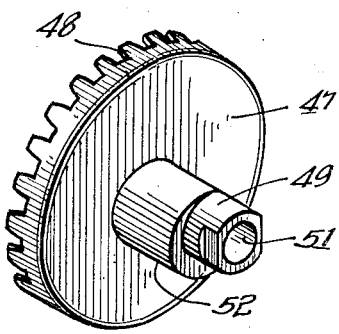
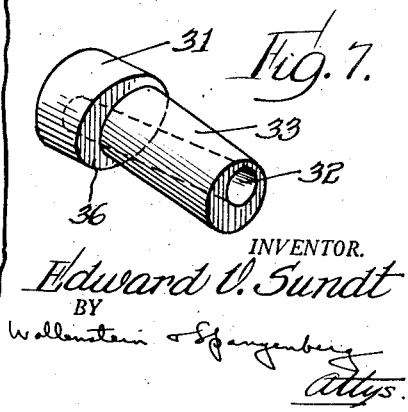
INVENTOR.
Edward V. Sundt
BY
Wallenstein & Spangenberg
Attys.

United States Patent Office 2,821,063
Patented Jan. 28, 1958

2,821,063

CLOCKWORK MECHANISM

Edward V. Sundt, Wilmette, Ill.

Application February 17, 1956, Serial No. 566,264

15 Claims. (Cl. 58—26)

The principal object of this invention is to provide an improved clockwork mechanism for electric clocks having a greatly simplified reduction gear train which may be simply and inexpensively manufactured and assembled, which is light in weight and concentric about its central axis so that it can be mounted on and wholly supported by the rotary shaft of the electric drive motor, and which eliminates many parts conventionally used in clockwork mechanisms.

Further objects of this invention reside in the details of construction of the clockwork mechanism and in the cooperative relationships between the component parts thereof.

Other objects and advantages of this invention will become apparent to those skilled in the art upon reference to the accompanying specification, claims and drawings in which:

Fig. 1 is a side elevational view, partly in section, of the clockwork mechanism of this invention.

Fig. 2 is a front plan view of the clockwork mechanism.

Fig. 3 is an enlarged sectional view through the clockwork mechanism taken substantially along the line 3—3 of Fig. 2.

Fig. 4 is a front elevational view taken from the right of Fig. 3 and showing the various clock hands.

Fig. 5 is a view taken substantially along the line 5—5 of Fig. 3.

Fig. 6 is a perspective view of the third toothed gear and the second eccentric rotated thereby.

Fig. 7 is a perspective view of the first eccentric which is rotated by the motor shaft.

Referring first to Figs. 1, 2 and 3, the clockwork mechanism of this invention is generally designated at 10. It includes a synchronous electric motor 11 having a gear reducer section 12 for rotating a shaft 13 which extends outwardly therefrom. Preferably, the shaft 13 is rotated in a clockwise direction at a fixed speed of 60 R. P. M. The shaft 13 is provided with a shoulder 14 and a reducer diameter extension 15, the extension 15 extending a considerable distance outwardly from the gear reducer section 12. A face plate 16, which also serves as a mounting plate, is arranged outwardly from the gear reducer section of the electric motor 11 and it is secured thereto in spaced relation by means of spacers 18 and screws 17 threaded into ears 19 on the gear reducer section 12. The face plate 16 is provided with a central opening 20 through which the rotating shaft 15 extends. The clockwork mechanism may be mounted by the face or mounting plate 16 in any desired manner as, for example, to a base 22. This may be accomplished by the use of spacers 23 which are secured to the face plate 16 by screws 24 and to the base 23 by screws 25.

Arranged adjacent to the gear reducer section 12 of the electric motor 11 is a first toothed gear 27 having a plurality of teeth 28. This gear 27 is provided with a flat annular surface 29 for frictionally engaging the flat outer surface of the gear reducer section 12 of the electric motor 11, the contacting surfaces forming a slip-friction means for normally securing the first toothed gear 27 against rotation but yet permitting forced rotation thereof for setting purposes. The first toothed gear 27 is held in frictional engagement with the gear reducer section 12 by a spring 30 arranged about the shaft 13 and having its outer periphery engaging the first toothed gear 27. This spring 30 is held in place and is flexed or stressed by an eccentric 31 having a bore 32 therethrough, the eccentric 31 being pressed-fit upon the shaft extension 15 against the shoulder 14 of the shaft. The eccentric 31 is provided with an oblique eccentric portion 33. The eccentric 31 is preferably formed of brass or similar material and the first toothed gear 27 is preferably formed of steel or the like.

Rotatably mounted on the oblique eccentric portion 33 of the eccentric 31 is a wobbler member 38, the wobbler member being provided with a hub portion 35 and being held in place on the eccentric by a shoulder 36 on the eccentric and a ring 37 pressed-fit on the eccentric. Preferably, the wobbler member 38 is molded from suitable plastic material such as nylon or the like. The wobbler member 38 is provided with three rings of gear teeth, the first ring being indicated at 39, the second ring at 40 and the third ring at 41. The first ring of gear teeth 39 mesh with the teeth 28 of the first toothed gear 27 so that the first toothed gear 27 reacts against the wobbler member 38 to control the rotation thereof. Thus, as the shaft 13 is rotated, the oblique eccentric 33 causes the wobbler member 38 to wobble and the meshing of the teeth 39 and 28 controls the rotation of the wobbler member 38. Preferably, the first toothed gear 27 has 59 teeth and the first ring of gear teeth 39 on the wobbler member 38 has 60 teeth. Since the shaft 13 rotates in a clockwise direction at a speed of 60 R. P. M. then the wobbler member 38 is caused to rotate in a clockwise direction at a speed of 1 R. P. M.

A second toothed gear 43 is provided with a plurality of teeth 44 which mesh with the second ring of gear teeth 40 on the wobbler member 38. The second toothed gear 43 is provided with an outwardly extending sleeve hub 45 which is rotatably mounted on and supported by the shaft extension 15. Preferably, the second toothed gear 43 is made of steel or the like and is suitably secured as by soldering to the sleeve hub 45 which may be made of brass or the like. The second ring of gear teeth 40 on the wobbler member 38 and the second toothed gear 43 have the same numbers of teeth as, for example, 36 teeth so that the second toothed gear 43 is rotated at the same speed as the wobbler member 38, namely, 1 R. P. M.

A third toothed gear 47 has a plurality of teeth 48 which mesh with the third ring of gear teeth 41 on the wobbler member 38. The third toothed gear 47 is pressed-fit on to a sleeve hub 49 against a shoulder 50 provided thereon. The sleeve hub 49 is provided with a bore 51 for rotatably mounting it and the third toothed gear 47 on the hub 45 of the second toothed gear and, accordingly, the third toothed gear 47, as well as the second toothed gear 43, are supported by the shaft extension 15. The sleeve hub 49 is also provided with an eccentric portion 52, this being the second eccentric utilized in the clockwork mechanism. Preferably, the third toothed gear 47 and the sleeve hub 49 and eccentric 52 are formed from brass or the like, with the toothed gear 47 being soldered to the flange 50 on the sleeve hub 49. The third ring of gear teeth 41 on the wobbler member 38 has 61 teeth and the third toothed gear 47 has 60 teeth. Thus, as the wobbler member 38 is wobbled, the third toothed gear 47 is rotated in a counter clockwise direction with respect to the wobbler member 38, but since the wobbler member 38 is being rotated in a clockwise direction at a speed of 1 R. P. M., the third toothed gear 47 is rotated in a clockwise direction at a speed of 1 R. P. H. Since the second eccentric 52 is secured to the third toothed gear 47 it is also rotated in a clockwise direction at 1 R. P. H.

Rotatably mounted on and supported by the second eccentric 52 is member 54 having first and second rings of gear teeth 55. Since the numbers of teeth in the two rings of gear teeth are the same, the two rings of gear teeth are shown to be one wide ring of gear teeth 55. Preferably, the member 54 is formed from steel or the like. The central opening 20 in the face plate 16 is formed to provide a plurality of gear teeth 56 which mesh with the teeth 55 on the member 54. The teeth 56 on the face plate 16 form the fourth toothed gear of the clockwork mechanism, this fourth toothed gear being a stationary gear. Preferably, the plate 16 is formed from brass or the like. The member 54 and the face plate 16 have the same numbers of teeth, there being 11 teeth 55 and 11 teeth 56. Because of this, the second member 54, as it is being oscillated by the second eccentric 52 is held against rotation, it having only a pure oscillatory movement. The frequency of oscillation of the member 54, since it is oscillated by the eccentric 52, is at 1 R. P. H.

A fifth toothed gear 58 is provided with a plurality of teeth 59 which mesh with the teeth 55 on the member 54. The fifth toothed gear 58 is provided with a hub 60 by means of which it is rotatably mounted on and supported by the sleeve hub 49 of the third toothed gear 47 so that this toothed gear 58 is also supported by the shaft extension 15. Preferably, this fifth toothed gear 58 and its hub 60 are formed from steel or the like. The fifth toothed gear 58 has 12 teeth 59 and since these 12 teeth 59 mesh with the 11 teeth 55 on the oscillating member 54, the fifth toothed gear 58 is rotated in a clockwise direction at 1 R. P. 12 H. (one revolution every 12 hours).

From the foregoing, it is seen that the simplified clockwork mechanism of this invention drives the shaft 15 at 60 R. P. M., the sleeve hub 45 at 1 R. P. M., the sleeve hub 49 at 1 R. P. H. and the hub 60 at 1 R. P. 12 H. The face plate 16 is provided with a suitable dial face graduated in 12 hours and 60 minutes and seconds, and suitable hands carried by and driven by the shaft and hubs, cooperate with the dial face for indicating time in hours, minutes, seconds and 60th seconds. A third hand 62 is pressed-fit on to a flat on the end of the shaft extension 15 and it is rotated at a speed of 1 R. P. S. for indicating time intervals of thirds (60th of a second). A second hand 63 is pressed-fit on to a flat on the sleeve hub 45 and is rotated at a speed of 1 R. P. M. for indicating seconds. A minute-hand 64 is pressed-fit on to a flat on the sleeve hub 49 and is rotated at a speed of 1 R. P. H. for indicating minutes. An hour hand 65 is pressed-fit on a flat on the hub 60 and is rotated at a speed of 1 R. P. 12 H. for indicating hours.

All of the parts of the clockwork mechanism are concentrically arranged about and supported by the motor shaft 13 and its extension 15 so that the necessity for separate shafts, spur gears, bearings and the like, which are found in conventional clockwork mechanisms, is eliminated, the clockwork mechanism of this invention, therefore, being simple in construction, utilizing the minimum number of parts and being simple and inexpensive to manufacture and assemble. In addition, the clockwork mechanism of this invention requires only a minimum of space, as, for example, the face plate 16 having dimensions of 2" x 4" and the entire depth of the clockwork mechanism including the hands and the electric motor being less than 2½".

The clockwork mechanism may also be readily set, this being accomplished by the slip-friction means associated with the first toothed gear 27. Normally, this toothed gear 27 is secured against rotation by the slip-friction means so as to provide proper operation of the clockwork mechanism. However, when it is desired to set the clockwork mechanism, all that is necessary is to forcefully turn the minute hand 64. This forceful turning of the third toothed gear 47 causes the turning of the wobbler member 38 and the first toothed gear 27 against the action of the slip-friction means comprising the spring 30 and the flat engaging surfaces between the first toothed gear 27 and the gear reducer portion 12 of the electric motor 11. When this forceful rotation is terminated upon reaching the desired setting, the slip-friction means again secures the first toothed gear 27 against rotation so that the clockwork mechanism will continue to operate accurately at the new setting. In lieu of setting the clockwork mechanism by manipulating the minute hand, the setting may be accomplished from the rear of the clockwork mechanism as illustrated more clearly in Fig. 1. Here, the normally stationary first year member 27 is provided with an additional set of gear teeth 67 which mesh with a pinion 68 carried by a shaft 70 journalled for rotation in a bracket 69 on the gear reducer section 12 of the electric motor. The shaft 70 extends rearwardly through a suitable opening 71 in the base 22 and is provided at its rear end with a knurled knob 72. By forcefully rotating the knob 72, the first toothed gear 27 is forcefully rotated against the action of the slip-friction means for rotating the wobbler member 38 and the gears driven thereby. When the appropriate setting is thus made, the first toothed gear 27 is again held against rotation by the slip-friction means and the clockwork mechanism operates accurately at the new setting.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. In a clockwork mechanism, a shaft rotating in a clockwise direction, an eccentric secured to the shaft for rotation therewith, a member rotatably mounted on the eccentric and oscillated thereby and having first, second and third rings of gear teeth arranged thereon, a first toothed gear secured against rotation and meshing with the first ring of gear teeth on the member to react against the member, said first ring of gear teeth having more teeth than the teeth on the first toothed gear to cause the member to rotate in a clockwise direction, a rotatably mounted second toothed gear meshing with the second ring of gear teeth on the member, said second ring of gear teeth and the second toothed gear having the same numbers of teeth to cause the second toothed gear to rotate in a clockwise direction at the same speed as the member, a rotatably mounted third toothed gear meshing with the third ring of gear teeth on the member, said third ring of gear teeth having more teeth than the teeth on the third toothed gear to cause the third toothed gear to rotate in a counterclockwise direction with respect to the member but in a clockwise direction at a lesser speed than the member.

2. In a clockwise mechanism, a shaft rotating in a clockwise direction, an oblique eccentric secured to the shaft for rotation therewith, a wobbler member rotatably mounted on the oblique eccentric and wobbled thereby and having first, second and third rings of gear teeth concentrically arranged thereon, a first toothed gear secured against rotation and meshing with the first ring of gear teeth on the wobbler member to react against the wobbler member, said first ring of gear teeth having more teeth than the teeth on the first toothed gear to cause the wobbler member to rotate in a clockwise direction, a rotatably mounted second toothed gear meshing with the second ring of gear teeth on the wobbler member, said second ring of gear teeth and the second toothed gear having the same numbers of teeth to cause the second toothed gear to rotate in a clockwise direction at the same speed as the wobbler member, a rotatably mounted third toothed gear meshing with the third ring of gear teeth on the wobbler member, said third ring of gear teeth having more teeth than the teeth on the third toothed gear to cause the third toothed gear to rotate in a counterclockwise direction with respect to the wobbler member but in a clockwise direction at a lesser speed than the wobbler member.

3. In a clock mechanism, a shaft rotating in a clockwise direction at 60 R. P. M., an eccentric secured to the shaft for rotation therewith, a member rotatably mounted on the eccentric and oscillated thereby and having first, second and third rings of gear teeth arranged thereon, a first toothed gear secured against rotation and meshing with the first ring of gear teeth on the member to react against the member, said first ring of gear teeth having 60 teeth and said first toothed gear having 59 teeth to cause the member to rotate in a clockwise direction at 1 R. P. M., a rotatably mounted second toothed gear meshing with the second ring of gear teeth on the member, said second ring of gear teeth and the second toothed gear having the same numbers of teeth to cause the second toothed gear to rotate in a clockwise direction at the same speed as the member, a rotatably mounted third toothed gear meshing with the third ring of gear teeth on the member, said third ring of gear teeth having 61 teeth and said third toothed gear having 60 teeth to cause the third toothed gear to rotate in a counterclockwise direction with respect to the member but in a clockwise direction at 1 R. P. H.

4. In a clock mechanism, a shaft rotating in a clockwise direction at 60 R. P. M., an oblique eccentric secured to the shaft for rotation therewith, a wobbler member rotatably mounted on the oblique eccentric and wobbled thereby and having first, second and third rings of gear teeth concentrically arranged thereon, a first toothed gear secured against rotation and meshing with the first ring of gear teeth on the wobbler member to react against the wobbler member, said first ring of gear teeth having 60 teeth and said first toothed gear having 59 teeth to cause the wobbler member to rotate in a clockwise direction at 1 R. P. M., a rotatably mounted second toothed gear meshing with the second ring of gear teeth on the wobbler member, said second ring of gear teeth and the second toothed gear having the same numbers of teeth to cause the second toothed gear to rotate in a clockwise direction at the same speed as the wobbler member, a rotatably mounted third toothed gear meshing with the third ring of gear teeth on the wobbler member, said third ring of gear teeth having 61 teeth and said third toothed gear having 60 teeth to cause the third toothed gear to rotate in a counterclockwise direction with respect to the wobbler member but in a clockwise direction at 1 R. P. H.

5. In a clockwork mechanism, a shaft rotating in a clockwise direction, a first eccentric secured to the shaft for rotation therewith, a first member rotatably mounted on the eccentric and oscillated thereby and having first, second and third rings of gear teeth arranged thereon, a first toothed gear secured against rotation and meshing with the first ring of gear teeth on the first member to react against the first member to cause the first member to rotate in a clockwise direction, a rotatably mounted second toothed gear meshing with the second ring of gear teeth on the first member to cause the second toothed gear to rotate in a clockwise direction, a rotatably mounted third toothed gear meshing with the third ring of gear teeth on the first member to cause the third toothed gear to rotate in a clockwise direction, a second eccentric secured to and rotated by the third toothed gear, a second member rotatably mounted on the second eccentric and oscillated thereby and having first and second rings of gear teeth arranged thereon, a fourth toothed gear secured against rotation and meshing with the first ring of gear teeth on the second member to react against the member to control the same, a rotatably mounted fifth toothed gear meshing with the second ring of gear teeth on the second member to cause the fifth toothed gear to rotate in a clockwise direction, a second hand secured to and rotated by the second toothed gear, a minute hand secured to and rotated by the third toothed gear, and an hour hand secured to and rotated by the fifth toothed gear.

6. In a clockwork mechanism, a shaft rotating in a clockwise direction at 60 R. P. M., a first eccentric secured to the shaft for rotation therewith, a first member rotatably mounted on the eccentric and oscillated thereby and having first, second and third rings of gear teeth arranged thereon, a first toothed gear secured against rotation and meshing with the first ring of gear teeth on the first member to react against the first member, said first ring of gear teeth having 60 teeth and said first toothed gear having 59 teeth to cause the member to rotate in a clockwise direction at 1 R. P. M., a rotatably mounted second toothed gear meshing with the second ring of gear teeth on the first member, said second ring of gear teeth and the second toothed gear having the same numbers of teeth to cause the second toothed gear to rotate in a clockwise direction at the same speed as the member, a rotatably mounted third toothed gear meshing with the third ring of gear teeth on the first member, said third ring of gear teeth having 61 teeth and said third toothed gear having 60 teeth to cause the third toothed gear to rotate in a counter-clockwise direction with respect to the member but in a clockwise direction at 1 R. P. H., a second eccentric secured to and rotated by the third toothed gear, a second member rotatably mounted on the second eccentric and oscillated thereby and having first and second rings of gear teeth arranged thereon, a fourth toothed gear secured against rotation and meshing with the first ring of gear teeth on the second member to react against the member, said first ring of gear teeth on the second member and the fourth toothed gear having the same numbers of teeth to hold the fourth toothed gear against rotation, a rotatably mounted fifth toothed gear meshing with the second ring of gear teeth on the second member, said second ring of gear teeth having 11 teeth and said fifth toothed gear having 12 teeth to cause the fifth toothed gear to rotate in a clockwise direction at a speed of 1 R. P. 12 H., a second hand secured to and rotated by the second toothed gear, a minute hand secured to and rotated by the third toothed gear, and an hour hand secured to and rotated by the fifth toothed gear.

7. A clockwork mechanism comprising a synchronous motor, a shaft extending therefrom and rotating in a clockwise direction, a first eccentric secured to the shaft for rotation therewith, a first member rotatably mounted on the eccentric and oscillated thereby and having first, second and third rings of gear teeth arranged thereon, a first toothed gear secured against rotation and meshing with the first ring of gear teeth on the first member to react against the first member to cause the first member to rotate in a clockwise direction, a second toothed gear having a hub rotatably mounted on and supported by the shaft and meshing with the second ring of gear teeth on the first member to cause the second toothed gear to rotate in a clockwise direction, a third toothed gear having a hub rotatably mounted on and supported by the hub of the second toothed gear and meshing with the third ring of gear teeth on the first member to cause the third toothed gear to rotate in a clockwise direction, a second eccentric secured to and rotated by the hub of the third toothed gear, a second member rotatably mounted on the second eccentric and oscillated thereby and having first and second rings of gear teeth arranged thereon, a fourth toothed gear secured against rotation and meshing with the first ring of gear teeth on the second member to react against the member to control the same, a fifth toothed gear rotatably mounted on and supported by the hub of the third toothed gear and meshing with the second ring of gear teeth on the second member to cause the fifth toothed gear to rotate in a clockwise direction, a second hand secured to and rotated by the hub of the second toothed gear, a minute hand secured to and rotated by the hub of the third toothed gear, and an hour hand secured to and rotated by the fifth toothed gear.

8. A clockwork mechanism comprising a synchronous motor, a shaft extending therefrom and rotating in a clockwise direction at 60 R. P. M., a first eccentric secured to the shaft for rotation therewith, a first member rotatably mounted on the eccentric and oscillated thereby and having first, second and third rings of gear teeth arranged thereon, a first toothed gear secured against rotation and meshing with the first ring of gear teeth on the first member to react against the first member, said first ring of gear teeth having 60 teeth and said first toothed gear having 59 teeth to cause the member to rotate in a clockwise direction at 1 R. P. M., a second toothed gear having a hub rotatably mounted on and supported by the shaft and meshing with the second ring of gear teeth on the first member, said second ring of gear teeth and the second toothed gear having the same numbers of teeth to cause the second toothed gear to rotate in a clockwise direction at the same speed as the member, a third toothed gear having a hub rotatably mounted on and supported by the hub of the second toothed gear and meshing with the third ring of gear teeth on the first member, said third ring of gear teeth having 61 teeth and said third toothed gear having 60 teeth to cause the third toothed gear to rotate in a counter-clockwise direction with respect to the fiirst member but in a clockwise direction at 1 R. P. H., a second eccentric secured to and rotated by the hub of the third toothed gear, a second member rotatably mounted on the second eccentric and oscillated thereby and having first and second rings of gear teeth arranged thereon, a fourth toothed gear secured against rotation and meshing with the first ring of gear teeth on the second member to react against the member, said first ring of gear teeth on the second member and the fourth toothed gear having the same numbers of teeth to hold the fourth toothed gear against rotation, a fifth toothed gear rotatably mounted on and supported by the hub of the third toothed gear and meshing with the second ring of gear teeth on the second member, said second ring of gear teeth on the second member having 11 teeth and said fifth toothed gear having 12 teeth to cause the fifth toothed gear to rotate in a clockwise direction at a speed of 1 R. P. 12 H., a second hand secured to and rotated by the hub of the second toothed gear, a minute hand secured to and rotated by the hub of the third toothed gear, and an hour hand secured to and rotated by the fifth toothed gear.

9. A clockwork mechanism comprising a synchronous motor, a shaft extending therefrom and rotating in a clockwise direction, a face plate secured to the motor in spaced relation thereto and having a central opening through which the shaft extends, a first eccentric secured adjacent the motor to the shaft for rotation therewith, a first member rotatably mounted on the eccentric and oscillated thereby and having first, second and third rings of gear teeth arranged thereon, a first toothed gear secured against rotation and meshing with the first ring of gear teeth on the first member to react against the first member to cause the member to rotate in a clockwise direction, a second toothed gear having a hub extending through the opening in the face plate and rotatably mounted on and supported by the shaft and meshing with the second ring of gear teeth on the first member to cause the second toothed gear to rotate in a clockwise direction, a third toothed gear having a hub extending through the opening in the face plate and rotatably mounted on and supported by the hub of the second toothed gear and meshing with the third ring of gear teeth on the first member to cause the third toothed gear to rotate in a clockwise direction, a second eccentric adjacent the opening in the face plate and secured to and rotated by the hub of the third toothed gear, a second member rotatably mounted on the second eccentric and oscillated thereby and having first and second rings of gear teeth arranged thereon, teeth formed in the opening in the base plate providing a fourth toothed gear secured against rotation and meshing with the first ring of gear teeth on the second member to react against the member to control the same, a fifth toothed gear rotatably mounted on and supported by the hub of the third toothed gear outboard from the face plate and meshing with the second ring of gear teeth on the second member to cause the fifth toothed gear to rotate in a clockwise direction, a second hand secured to and rotated by the outboard end of the hub of the second toothed gear, a minute hand secured to and rotated by the outboard end of the hub of the third toothed gear, and an hour hand secured to and rotated by the fifth toothed gear.

10. A clockwork mechanism comprising a synchronous motor, a shaft extending therefrom and rotating in a clockwise direction at 60 R. P. M., a face plate secured to the motor in spaced relation thereto and having a central opening through which the shaft extends, a first eccentric secured adjacent the motor to the shaft for rotation therewith, a first member rotatably mounted on the eccentric and oscillated thereby and having first, second and third rings of gear teeth arranged thereon, a first toothed gear secured against rotation and meshing with the first ring of gear teeth on the first member to react against the first member, said first ring of gear teeth having 60 teeth and said first toothed gear having 59 teeth to cause the member to rotate in a clockwise direction at 1 R. P. M., a second toothed gear having a hub extending through the opening in the face plate and rotatably mounted on and supported by the shaft and meshing with the second ring of gear teeth on the first member, said second ring of gear teeth and the second toothed gear having the same numbers of teeth to cause the second toothed gear to rotate in a clockwise direction at the same speed as the member, a third toothed gear having a hub extending through the opening in the face plate and rotatably mounted on and supported by the hub of the second toothed gear and meshing with the third ring of gear teeth on the first member, said third ring of gear teeth having 61 teeth and said third toothed gear having 60 teeth to cause the third toothed gear to rotate in a counterclockwise direction with respect to the first member but in a clockwise direction at 1 R. P. H., a second eccentric secured to and rotated by the hub of the third toothed gear, a second member rotatably mounted on the second eccentric and oscillated thereby and having first and second rings of gear teeth arranged thereon, teeth formed in the opening in the base plate and providing a fourth toothed gear secured against rotation and meshing with the first ring of gear teeth on the second member to react against the member, said first ring of gear teeth on the second member and the fourth toothed gear having the same numbers of teeth to hold the fourth toothed gear against rotation, a fifth toothed gear rotatably mounted on and supported by the hub of the third toothed gear outboard from the face plate and meshing with the second ring of gear teeth on the second member, said second ring of gear teeth on the second member having 11 teeth and said fifth toothed gear having 12 teeth to cause the fifth toothed gear to rotate in a clockwise direction at a speed of 1 R. P. 12 H., a second hand secured to and rotated by the outboard end of the hub of the second toothed gear, a minute hand secured to and rotated by the outboard end of the hub of the third toothed gear, and an hour hand secured to and rotated by the fifth toothed gear.

11. In a clockwork mechanism, a shaft rotating in a clockwise direction, an eccentric secured to the shaft for rotation therewith, a member rotatably mounted on the eccentric and oscillated thereby and having first, second and third rings of gear teeth arranged thereon, a first toothed gear meshing with the first ring of gear teeth on the member, means including friction slip means for normally securing the first toothed gear against rotation to react against the member to cause the member to rotate in a clockwise direction, but allowing forced rotation of the first toothed gear and member for setting purposes, a rotatably mounted second toothed gear meshing with the second ring of gear teeth on the member to cause the second toothed gear to rotate in a clockwise direction, a rotatably mounted third toothed gear meshing with the third ring of gear teeth on the member to cause the third toothed gear to rotate in a clockwise direction.

12. In a clockwork mechanism, a shaft rotating in a clockwise direction, a first eccentric secured to the shaft for rotation therewith, a first member rotatably mounted on the eccentric and oscillated thereby and having first, second and third rings of gear teeth arranged thereon, a first toothed gear meshing with the first ring of gear teeth on the first member, means including friction slip means for normally securing the first toothed gear against rotation to react against the first member to cause the member to rotate in a clockwise direction, but allowing forced rotation of the first toothed gear and first member for setting purposes, a rotatably mounted second toothed gear meshing with the second ring of gear teeth on the first member to cause the second toothed gear to rotate in a clockwise direction, a rotatably mounted third toothed gear meshing with the third ring of gear teeth on the first member to cause the third toothed gear to rotate in a clockwise direction, a second eccentric secured to and rotated by the third toothed gear, a second member rotatably mounted on the second eccentric and oscillated thereby and having first and second rings of gear teeth arranged thereon, a fourth toothed gear secured against rotation and meshing with the first ring of gear teeth on the second member to react against the member to control the same, a rotatably mounted fifth toothed gear meshing with the second ring of gear teeth on the second member to cause the fifth toothed gear to rotate in a clockwise direction, a second hand secured to and rotated by the second toothed gear, a minute hand secured to and rotated by the third toothed gear, and an hour hand secured to and rotated by the fifth toothed gear.

13. In a clockwork mechanism, a shaft rotating in a clockwise direction, a first eccentric secured to the shaft for rotation therewith, a first member rotatably mounted on the eccentric and oscillated thereby and having first, second and third rings of gear teeth arranged thereon, a first toothed gear secured against rotation and meshing with the first ring of gear teeth on the first member to react against the first member to cause the first member to rotate in a clockwise direction, a rotatably mounted second toothed gear meshing with the second ring of gear teeth on the first member to cause the second toothed gear to rotate in a clockwise direction, a rotatably mounted third toothed gear meshing with the third ring of gear teeth on the first member to cause the third toothed gear to rotate in a clockwise direction, a second eccentric secured to and rotated by the third toothed gear, a second member rotatably mounted on the second eccentric and oscillated thereby and having first and second rings of gear teeth arranged thereon, a fourth toothed gear secured against rotation and meshing with the first ring of gear teeth on the second member to react against the member to control the same, a rotatably mounted fifth toothed gear meshing with the second ring of gear teeth on the second member to cause the fifth toothed gear to rotate in a clockwise direction, a third hand secured to and rotated by the shaft, a second hand secured to and rotated by the second toothed gear, a minute hand secured to and rotated by the third toothed gear, and an hour hand secured to and rotated by the fifth toothed gear.

14. In a clockwork mechanism, a shaft rotating in a clockwise direction at 60 R. P. M., a first eccentric secured to the shaft for rotation therewith, a first member rotatably mounted on the eccentric and oscillated thereby and having first, second and third rings of gear teeth arranged thereon, a first toothed gear secured against rotation and meshing with the first ring of gear teeth on the first member to react against the first member, said first ring of gear teeth having 60 teeth and said first toothed gear having 59 teeth to cause the member to rotate in a clockwise direction at 1 R. P. M., a rotatably mounted second toothed gear meshing with the second ring of gear teeth on the first member, said second ring of gear teeth and the second toothed gear having the same numbers of teeth to cause the second toothed gear to rotate in a clockwise direction at the same speed as the member, a rotatably mounted third toothed gear meshing with the third ring of gear teeth on the first member, said third ring of gear teeth having 61 teeth and said third toothed gear having 60 teeth to cause the third toothed gear to rotate in a counter clockwise direction with respect to the member but in a clockwise direction at 1 R. P. H., a second eccentric secured to and rotated by the third toothed gear, a second member rotatably mounted on the second eccentric and oscillated thereby and having first and second rings of gear teeth arranged thereon, a fourth toothed gear secured against rotation and meshing with the first ring of gear teeth on the second member to react against the member, said first ring of gear teeth on the second member and the fourth toothed gear having the same numbers of teeth to hold the fourth toothed gear against rotation, a rotatably mounted fifth toothed gear meshing with the second ring of gear teeth on the second member, said second ring of gear teeth having 11 teeth and said fifth toothed gear having 12 teeth to cause the fifth toothed gear to rotate in a clockwise direction at a speed of 1 R. P. 12 H., a third hand secured to and rotated by the shaft, a second hand secured to and rotated by the second toothed gear, a minute hand secured to and rotated by the third toothed gear, and an hour hand secured to and rotated by the fifth toothed gear.

15. A clockwork mechanism comprising a synchronous motor, a shaft extending therefrom and rotating in a clockwise direction at 60 R. P. M., a first eccentric secured to the shaft for rotation therewith, a first member rotatably mounted on the eccentric and oscillated thereby and having first, second and third rings of gear teeth arranged thereon, a first toothed gear secured against rotation and meshing with the first ring of gear teeth on the first member to react against the first member, said first ring of gear teeth having 60 teeth and said first toothed gear having 59 teeth to cause the member to rotate in a clockwise direction at 1 R. P. M., a second toothed gear having a hub rotatably mounted on and supported by the shaft and meshing with the second ring of gear teeth on the first member, said second ring of gear teeth and the second toothed gear having the same numbers of teeth to cause the second toothed gear to rotate in a clockwise direction at the same speed as the member, a third toothed gear having a hub rotatably mounted on and supported by the hub of the second toothed gear and meshing with the third ring of gear teeth on the first member, said third ring of gear teeth having 61 teeth and said third toothed gear having 60 teeth to cause the third toothed gear to rotate in a counter-clockwise direction with respect to the first member but in a clockwise direction at 1 R. P. H., a second eccentric secured to and rotated by the hub of the third toothed gear, a second member rotatably mounted on the second eccentric and oscillated thereby and having first and second rings of gear teeth arranged thereon, a fourth toothed gear secured against rotation and meshing with the first ring of gear teeth on the second member to react against the member, said first ring of gear teeth on the second member and the fourth toothed gear having the same numbers of teeth to hold the fourth toothed gear against rotation, a fifth toothed gear rotatably mounted on and supported by the hub of the third toothed gear and meshing with the second ring of gear teeth on the second member, said second ring of gear teeth on the second member having 11 teeth and said fifth toothed gear having 12 teeth to cause the fifth toothed gear to rotate in a clockwise direction at a speed of 1 R. P. 12 H., a third hand secured to and rotated by the shaft, a second hand secured to and rotated by the hub of the second toothed gear, a minute hand secured to and rotated by the hub of the third toothed gear, and an hour hand secured to and rotated by the fifth toothed gear.

References Cited in the file of this patent

FOREIGN PATENTS 155,057     Australia _____ Feb. 4, 1954